Jan. 4, 1966  G. J. GRIESMER ETAL  3,226,914
PRESSURE CYCLE FOR MOLECULAR SIEVE SEPARATION OF NORMAL
PARAFFINS FROM HYDROCARBON MIXTURES
Filed Sept. 4, 1962  4 Sheets-Sheet 3

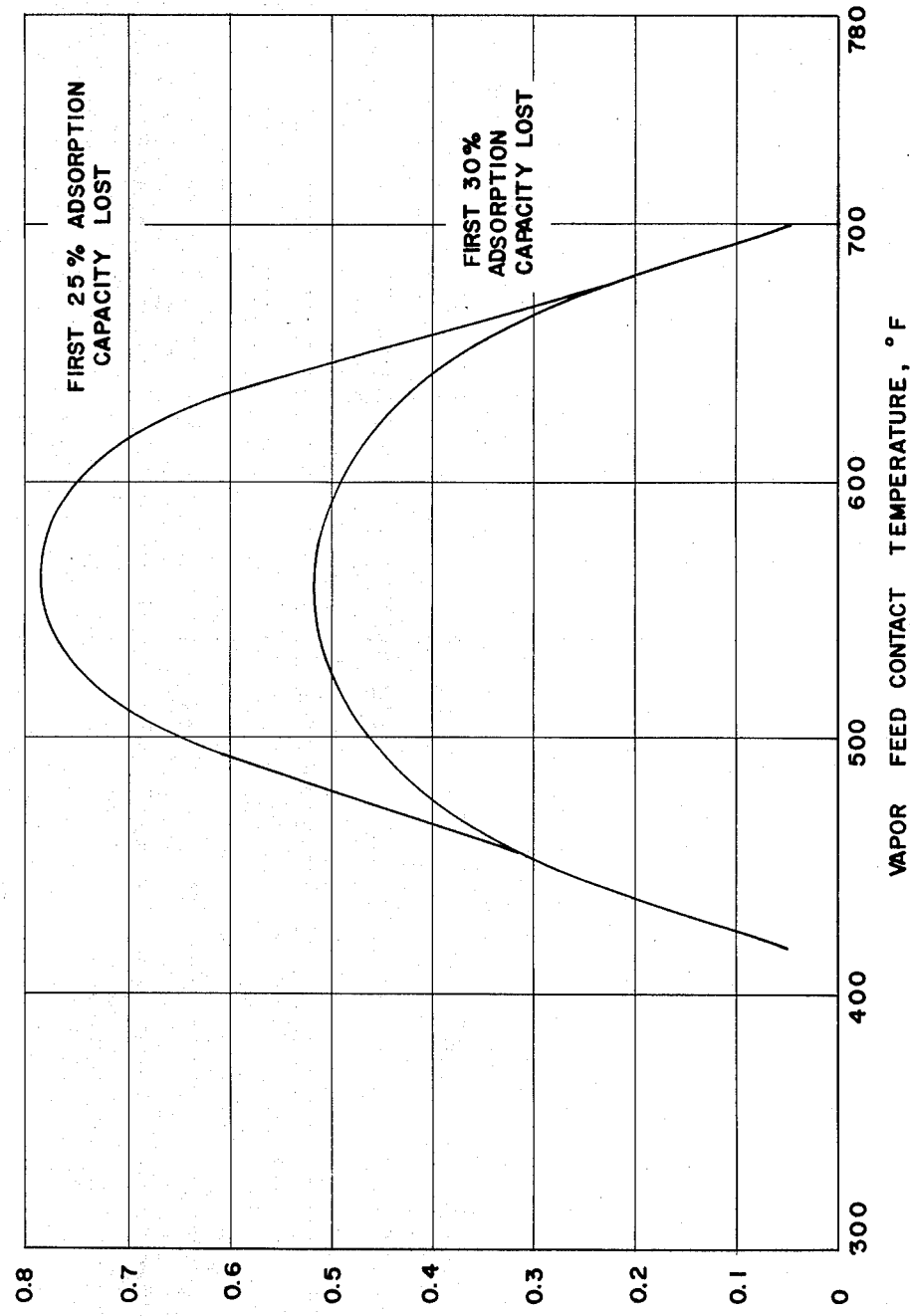

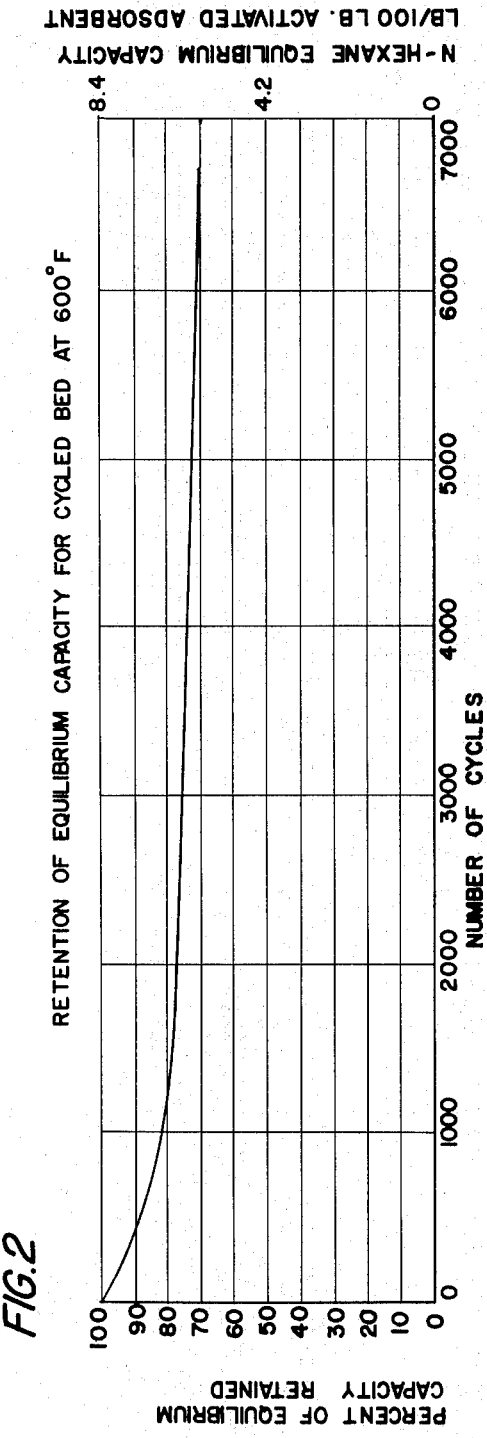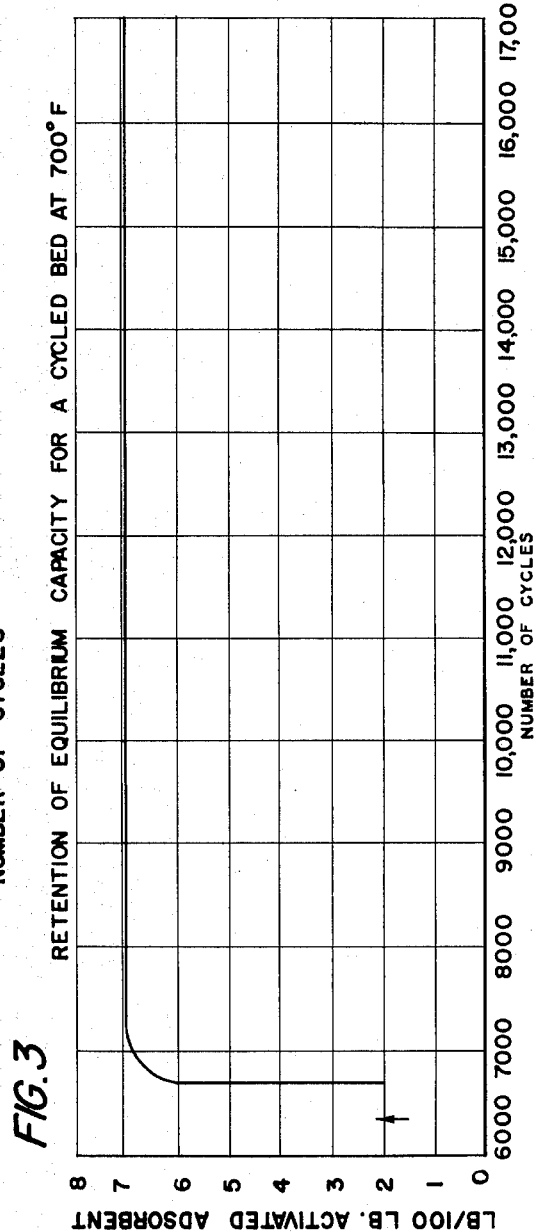

END OF ABSORPTION STEP

END OF COCURRENT REPRESSURIZATION STEP

END OF COUNTERCURRENT REPRESSURIZATION STEP

INVENTORS
KAZUO KIYONAGA
GERARD J. GRIESMER
BY John C. LeFever
ATTORNEY

United States Patent Office 3,226,914
Patented Jan. 4, 1966

1

3,226,914
PRESSURE CYCLE FOR MOLECULAR SIEVE SEPARATION OF NORMAL PARAFFINS FROM HYDROCARBON MIXTURES
Gerard J. Griesmer, Kenmore, N.Y., and Kazuo Kiyonaga, Newark, N.J., assignors to Union Carbide Corporation, a corporation of New York
Filed Sept. 4, 1962, Ser. No. 221,003
4 Claims. (Cl. 55—58)

This is a continuation-in-part application of U.S Serial No. 806,101, filed April 13, 1959, now abandoned, which is in turn a continuation-in-part of U.S. Serial No. 716,-397, filed February 20, 1958, now abandoned.

This invention relates to a process for separating a gaseous mixture by selective adsorption of at least one component in a crystalline zeolitic molecular sieve material, and in one embodiment to a process for separating normal paraffins containing at least four carbon atoms from a hydrocarbon vapor feed mixtures.

Normal paraffins are often found in naphtha streams with branched chain and non-aliphatic hydrocarbons; there is a growing industrial need for large quantities of normal paraffinic compounds freed of these impurities. Normal paraffins are, for example, used in jet fuel, industrial solvents, raw materials for "biologically soft" detergents and cracking stocks for manufacture of olefins. They are also attractive for use in the production of chlorinated petroleum waxes, lubricants, plasticizers, flameproofing agents and vegetable oils. The presence of impurities such as aromatics often have a detrimental effect on these products.

There is also a continued and growing demand for low-boiling gases free of atmospheric contaminants such as moisture, carbon dioxide and acetylene, as well as light hydrocarbons. For example, many end uses of oxygen and hydrogen preclude the presence of appreciable impurities for safety reasons.

The only commercially used method for separating n-paraffins is superfractionation, wherein the various constituents are separated on the basis of their boiling points, However, this method requires distillation columns containing expensive liquid-gas contact surfaces such as trays. Moreover, there is often very little difference in boiling points between the normal paraffin and the impurity, so that little distillation driving force exists and a large number of trays are needed to effect the desired separation.

Various adsorption schemes have been proposed, as for example those using crystalline zeolitic molecular sieves as a selective adsorbent for the normal paraffins. One serious problem encountered in all adsorption systems is the deposition of carbonaceous matter from the feed stock in or on the adsorbent. That is, under the elevated temperatures necessary for gas phase contact between the hydrocarbon feed and the adsorbent, i.e., 400–800° F., the feed stock undergoes various chemical changes as, for example, cracking, polymerization, and aromatization. The reactions leading to increased molecular weight hydrocarbons are followed by coking, which is the formation of residues having a hydrogen-to-carbon ratio of less than 1. In the case of molecular sieves, the coke deposits in the uniformly sized pores and also in the inner cagework of the three-dimensional aluminosilicate crystal, thereby altering the adsorptive characteristics and reducing the adsorption capacity of the material.

2

The coke deposits are not appreciably removed from the molecuar sieve by purging conditions, so that the deposits progressively build up to the point where the molecular sieve no longer performs its selective adsorption function in an effective manner. When this condition is reached, the adsorption bed must be taken off-stream and reactivated by burn-off of the coke in an oxygen-containing atmosphere. As a consequence, previously proposed n-paraffin separation systems have necessitated at least three separate adsorbers for continuous operation, so that one unit could be regenerated while the other units were on adsorption and desorption strokes.

Another disadvantage of the previously proposed molecular sieve system for separating gas mixtures is that a heated purge gas was necessary to effectively remove the adsorbate during the desorption stroke. This meant that auxiliary heat-up and purge equipment was required, and the rate of adsorption-desorption cycling was limited which in turn limited the gas throughput per unit time. Also, varying temperature processes of this type present equipment maintenance problems.

An object of this invention is to provide an improved process for separating a gaseous mixture by selective adsorption in crystalline zeolitic molecular sieves.

Another object is to provide an improved process for separating normal paraffins of at least four carbon atoms from a hydrocaron feed mixture. A further object is to provide such a process that substantially reduces coke build-up in the molecular sieve, which permits continuous operation with only two adsorbers, and which does not require a heated purge gas step.

These and other objects and advantages of the invention will be apparent from the following description and the appended drawings in which:

FIG. 1 is a graph showing the relationship between molecular sieve deactivation rate and vapor feed contact temperature;

FIG. 2 is a graph showing the relationship between retention of molecular sieve adsorption capacity and the number of adsorption-desorption cycles at 600° F.;

FIG. 3 is a graph showing the relationship between retention of molecular sieve adsorption capacity and the number of adsorption-desorption cycles at 700° F.;

Figure 4A:
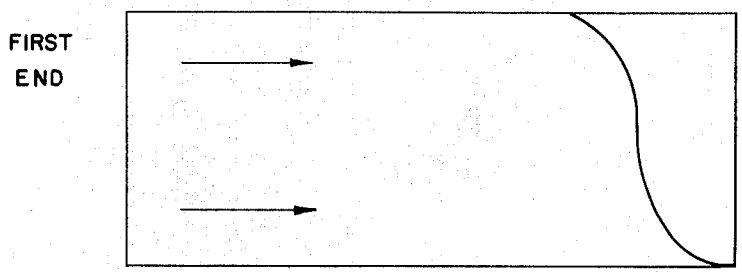
FIGS. 4a–4c is a series of schematic diagrams showing the progress of an adsorption front as it moves through an adsorption zone during the steps of adsorption, co-current repressurization, and countercurrent repressurization respectively.

According to one embodiment of the invention, a process is provided for separating normal paraffins containing at least four carbon atoms from a vapor feed mixture thereof with other hydrocarbons. This process involves repeating in sequence the steps of first flowing the hydrocarbon vapor feed mixture at a selected initial relatively high pressure into one end of an adsorption zone containing crystalline zeolitic molecular sieve material which selectively adsorbs the normal paraffins having critical dimensions up to about 5 Angstrom units. The vapor feed mixture and the molecular sieve material are contacted at temperatures between about 660° F. and 850° F., and a gaseous effluent stream is discharged from the other end of the adsorption zone under substantially the initial pressure thereof. Next, the pressure at the one end where the feed entered is reduced to a secondary relatively low pressure, and a gas stream is withdrawn from this end without the introduction of external heat. That is, a heated purge gas is not employed. In this manner, the normal paraffins are progressively desorbed from the molecular sieve and countercurrently flowed toward the feed inlet end for discharge therefrom.

It has been unexpectedly discovered that coking is minimized when the n-paraffin containing vapor feed stream and the molecular sieve bed are contacted at temperatures between about 660° F. and 850° F. One might logically conclude that since the rate of n-paraffin conversion to other hydrocarbons, i.e., polymerized cracked products, increases with increasing temperature, that optimum results would occur when the vapor feed-molecular sieve contact was at relatively low temperatures. Contrary to these expectations, applicants have found that the rate of deactivation of the molecular sieve, or stated in another manner, the percent of equilibrium adsorption capacity lost for a given number of cycles, is minimized within a certain relatively high temperature range.

This criticality is illustrated in FIG. 1, which is a plot of molecular sieve deactivation rate versus vapor feed contact temperature. As the contact temperature increases, the residence time decreases and a smaller quantity of n-paraffins are adsorbed on the molecular sieve. Another characteristic of higher contact temperatures is increased thermal cracking, which, of course, tends to decrease the yield of n-paraffins. Based on these considerations, one would logically conclude that it would be undesirable to effect the hydrocarbon feed-molecular sieve contact at relatively high temperature on the order of 660°–800° F. However, it has been found that since the average bed loading over one cycle (adsorption and desorption strokes) is reduced at high temperatures, less normals are available to crack at any given time. The small amount of relatively heavy hydrocarbons adsorbed from the feed stock formed or during the molecular sieve contact are immediately removed at the relatively high contact temperatures before a significant degree of hydrocarbon conversion takes place, so that reduced contact time becomes advantageous. The net result is a lower deactivation rate in this high temperature range.

In the tests shown in FIG. 1, a light naphtha vapor feedstock containing about 45 mol percent straight chain saturates and 55 mol percent nonstraight chain hydrocarbons and having an end point of 170° F. was passed in one direction at 75 p.s.i.a. through an adsorption zone containing calcium zeolite A, having an apparent pore size of about 5 Angstrom units. This molecular sieve was prepared in the manner described in U.S. Patent No. 2,882,243 to R. M. Milton. The adsorption temperature was either 440° F., 600° F. or 700° F., depending on the particular run. The adsorbed normal paraffins were desorbed from the molecular sieve by terminating the feedstock flow and reducing the pressure at the inlet end of the adsorption zone to about 1 p.s.i.a., without the introduction of external heat. The deactivation rate was measured in terms of loss of n-hexane adsorption capacity.

It will be apparent from FIG. 1 that the deactivation rate is time-dependent as well as temperature-dependent. For example, at 560° F., which gives the fastest deactivation, 25% of the adsorption capacity is lost at an overall rate of almost 0.8% per 100 cycles, while the overall rate for 30% loss is about 0.5% per 100 cycles.

The 600° F. and 700° F. tests are also illustrated in FIGS. 2 and 3, respectively, where percent retention of the molecular sieve's equilibrium capacity for n-hexane is plotted as a function of the number of adsorption-desorption cycles. The single adsorption bed comprises 0.436 pound of calcium zeolite A, in a column 1.12 inches I.D. by 18 inches long. The adsorption step was conducted in an upflow direction for a 4.8 minute period at a flow rate of 0.00235 gallon/minute to a pressure of 75 p.s.i.a., followed by desorption in a downflow direction for a five-minute period to a pressure of 1 p.s.i.a. The complete cycle of 9.8 minutes was repeated automatically, and periodically stopped for determination of the molecular sieve's adsorption capacity. A typical analysis of the feedstock is as follows:

| Component: | Concentration, mol percent |
|---|---|
| Iso-butane | — |
| n-Butane | 0.3 |
| Iso-pentane | 20.0 |
| n-Pentane | 29.2 |
| 2,2-dimethylbutane | 0.3 |
| 2-methylpentane | 8.8 |
| 3-methylpentane | 6.4 |
| n-Hexane | 15.7 |
| 2,4-dimethylpentane | 0.6 |
| Methylcyclopentane | 11.2 |
| 2-methylhexane | 0.8 |
| 2,3-dimethylpentane | 0.8 |
| Cyclohexane | 4.2 |
| 2,2,4-trimethylpentane | 0.7 |
| Benzene | 1.0 |
| Total | 100.0 |

Cyclic operation was begun at cycle 1 with the temperature of the adsorption column at 600° F. The initial equilibrium capacity of the molecular sieve was 8.4 pounds of n-hexane per 100 pounds of activated adsorbent at the standard conditions used for measuring capacity—2.7 p.s.i.a. n-hexane at 300° F. A total of 6701 cycles were run at this temperature, and the adsorption capacity fall-off is shown graphically in FIG. 2. By cycle 1800, the bed had reached a constant deactivation rate of 0.18% loss of original adsorption capacity per 100 cycles. The deactivation from the start to cycle 1800 averaged, overall, 1.22 percent loss per 100 cycles.

Starting with cycle 6702, the adsorbent bed temperature was raised to 700° F., and the molecular sieve regained almost 11% of its original capacity. Thereafter, the deactivation rate was 0.019 percent per 100 cycles which is only one-tenth that observed at 600° F. During the 16,370 cycles of adsorption-desorption by countercurrent depressurization, a total of 120 gallons of naphtha was processed.

Analysis of the unadsorbed effluent product and the desorbate product sampled at the end of the 700° F. operation showed that the selectivity of the molecular sieve for normal paraffins was retained. The analyses were as follows:

| Component | Composition in Mol percent | |
|---|---|---|
|  | Unadsorbed | Desorbed |
| n-Butane | 0.02 | 0.09 |
| Iso-Pentane | 25.61 | 4.43 |
| n-Pentane | 1.55 | 44.14 |
| 2,2-Dimethylbutane | 0.51 | 0.21 |
| 2-Methylpentane | 19.80 | 3.06 |
| 3-Methylpentane | 12.96 | 2.59 |
| n-Hexane | 0 | 28.66 |
| 2,4-Dimethylpentane | 1.64 | 0.31 |
| Methylcyclopentane | 22.32 | 3.27 |
| 2-Methylhexane | 1.93 | 0.31 |
| Cyclohexane | 9.83 | 1.44 |
| 2,2,4-Trimethylpentane | 1.55 | 0 |
| n-Heptane | 0 | 11.05 |
| Benzene | 2.27 | 0.43 |

There are two types of molecular sieve n-paraffin adsorption capacity loss encountered during cycle operation. The first loss occurs during the first few cycles of operation and is attributed to the accumulation of volatile n-paraffins on the bed which are not removed during the desorption stroke of the cycle. The second is a gradual loss in capacity as the bed is cycled, due to (1) a slow accumulation of heavy end constituents, olefins and sulfur compounds; (2) cracking and/or polymerization of these materials; and (3) cracking of the normal paraffins accompanied by an accumulation on the bed of the cracked products.

Referring now to FIG. 2, it can be seen that the molecular sieve suffered a relatively sharp loss in n-hexane adsorption capacity during the first few cycles, due to this accumulation of volatile n-paraffins. After this initial loss of adsorption sites in the sieve, the rate of deactivation is much lower. When the adsorbent bed temperature was raised to 700° F., as shown in FIG. 3, the molecular sieve was sufficiently hot for stripping of virtually all of the volatile hydrocarbons during the desorption stroke.

In still another example a crude distillate feed gas stream having an end point of 525° F. and containing 28.4% $C_{10}$–$C_{16}$ normal paraffins was contacted with a bed of calcium zeolite A at 50 p.s.i.a., and temperatures of 700° F. and 770° F. during separate runs. The cyclic operation also included countercurrent depressurization to 0.5 p.s.i.a., countercurrent purging with n-pentane at 0.5 p.s.i.a., and finally countercurrent repressurization with heptane isomers to simulate the product effluent. After two days of cyclic operation, the 770° F. run was found to have less than one-half as much coke build-up than operation at 700° F. produced for a similar period of time. The carbon analyses were as follows:

| Fraction of Distance From Feed Inlet and Towards Effluent End | 770° F. | 700° F. |
|---|---|---|
| | Wt.-percent | Wt.-percent |
| 1.0 | 1.2 | 3.0 |
| 0.8 | 1.2 | 3.3 |
| 0.6 | 1.2 | 3.4 |
| 0.4 | 1.9 | 3.4 |
| 0.2 | 1.8 | 3.4 |
| 0 | 1.8 | 3.9 |

As previously discussed the hydrocarbon containing vapor feed mixture and the molecular sieve material are contacted at temperatures between about 660° F. and 850° F. Above this temperature range the amount of cracking increases at a prohibitively high rate, thereby decreasing the recoverable amount of normal paraffins. When the feedstock contains $C_5$ through $C_{12}$ normal paraffins as primary constituents, the contact temperature is preferable between about 660° F. and 750° F. This upper limit represents a balance between the amount of surface retention of normally unadsorbed materials and weight loading of the normal paraffin adsorbate. With feedstocks containing primarily $C_{10}$ through $C_{16}$ normal paraffins the contact temperature is preferably 700°–800° F., and for $C_{15}$ through $C_{22}$ materials preferably 750°–850° F. In these ranges the amount of surface retention of normally unadsorbed materials is minimized and the thoroughness of desorption is improved. The latter is particularly important with higher boiling-longer chain feedstocks because they are more thermally unstable and consequently lead to more coking.

The low deactivation rate obtained by employing the 660°–850° F. adsorption and countercurrent desorption temperature has also been demonstrated in a large commercial-scale unit. The latter comprises two 18,000 pound adsorption beds of clay-bonded ⅛-inch pellets of calcium zeolite A arranged so that one bed is adsorbing normal paraffins while the other is under-going desorption by countercurrent depressurization. The light naphtha feedstock contained 27.7% $C_4$ through $C_{13}$ normal paraffins and the adsorption stroke was conducted at 80 p.s.i.a. The desorption stroke was conducted by evacuation at the feed gas inlet end of the bed to about 0.5 p.s.i.a., and the desorbate contained 95.8% $C_4$ through $C_{13}$ normal paraffins.

The unit was operated on 3 adsorption and 3 desorption cycles per bed per hour for 2700 hours, processing 1750 gallons per hour of the naphtha feedstock. Gradual loss of adsorption capacity was detected and after about 2700 hours on stream, the calcium zeolite A adsorbent was sampled and found to have a 3 to 3.5 wt.-percent carbon deposit which represents a 25–30% loss of initial adsorption capacity. This is considered excellent performance by commercial standards.

The instant process was also successfully employed for the adsorption of $C_{12}$ through $C_{21}$ normal paraffins from a hydrocarbon vapor feed stream containing 25.1% normal paraffins, 19.0% aromatics, 0.5% olefins, and 55.4% other constituents. The normal paraffin portion of the feedstock was analyzed as follows:

| Component: | Mol percent |
|---|---|
| $n$-$C_9$ | 0.2 |
| $n$-$C_{10}$ | 0.3 |
| $n$-$C_{11}$ | 3.9 |
| $n$-$C_{12}$ | 1.3 |
| $n$-$C_{13}$ | 2.5 |
| $n$-$C_{14}$ | 3.3 |
| $n$-$C_{15}$ | 3.9 |
| $n$-$C_{16}$ | 3.9 |
| $n$-$C_{17}$ | 4.0 |
| $n$-$C_{18}$ | 2.1 |
| $n$-$C_{19}$ | 1.6 |
| $n$-$C_{20}$ | 0.7 |
| $n$-$C_{21}$ | 0.3 |
| Total | 25.1 |

The bed comprised 2350 grams of calcium zeolite A, the adsorption pressure was 35 p.s.i.g. and the adsorption temperature was 707° F. Desorption was without the introduction of external heat, countercurrent to the vapor feed, and at 0.5 p.s.i.a. Only about 0.24% by weight of the feed was cracked to gaseous products.

It has been furthermore discovered that the purity and yield of the normal paraffins may be maximized by increasing the pressure in the adsorption zone at the end of the countercurent desorption step from the secondary relatively low pressure to a higher pressure by introducing a substantially non-adsorbable gas at the other or gaseous effluent discharge and of the bed. The non-adsorbable gas may be provided from an external source, as for example nitrogen from an air separation plant, or methane separated from natural gas. Other suitable repressurizing gases which could be provided from an external source include helium, hydrogen and argon. The repressurizing gas is preferably at least a portion of the gaseous effluent stream discharged from the other end of the bed during the adsorption step, as for example the branched chain saturated and cyclic constituents of a light naphtha stream.

Figure 4B:
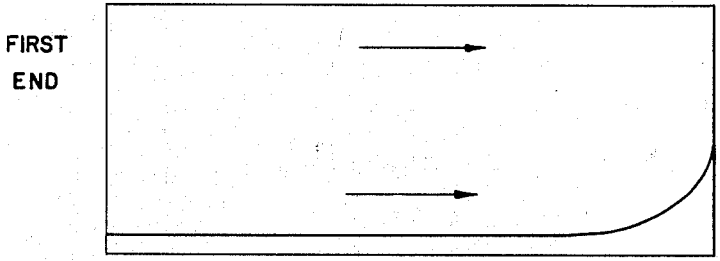

The probable explanation for improved purity and yield of normal paraffins by virtue of countercurrent repressurization of the molecular sieve adsorbent bed is as follows: During the adsorption step an adsorption front moves progressively from the inlet or one end towards the other or effluent end of the bed, and is usually relatively close to the latter when the adsorption step is terminated, as illustrated in FIG. 4a. If after desorption by countercurrent depressurization, the bed is repressurized cocurrently by the introduction of non-adsorbable gas at the one end, there would be a low loading of adsorbate extending virtually at the same level from this end to near the other end, corresponding to equilibrium conditions. However, the bulk of the normal paraffin adsorbate remaining in the bed will have been moved towards the other end and concentrated at this end, as illustrated in FIG. 4b. When adsorption is resumed, this concentrated n-paraffin adsorbate will be stripped off the molecular sieve and discharged from the other end of the bed with the non-adsorbed portion of the feed gas. Such a consequence is undesirable for two reasons: firstly, the stripped n-paraffins are lost in the effluent gas and thus limit the yield of n-paraffin product. Also, if the non-normal hydrocarbons constituting the effluent are desired for end use, the presence of n-paraffins therein may constitute a deleterious impurity, as for example when non-straight chain paraffins are to be used as gasolines.

Figure 4C:
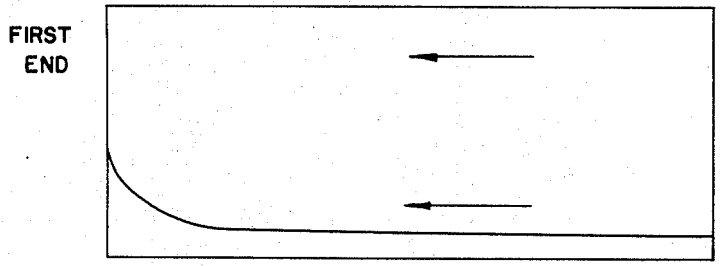

These disadvantages are completely avoided by repressuring the adsorbent bed in a direction countercurrent to the feed gas flow, as illustrated in FIG. 4c. When the non-adsorbable gas is introduced at the other end, the bulk of the remaining n-paraffin concentration is stripped and moved backwardly towards the one end so that when the repressurization is complete, the n-paraffins are concentrated at this end. When the adsorption step is renewed, the n-paraffin concentration at the one end is pushed back towards the middle portion of the bed by the feed gas, and readsorbed. In this manner, loss of n-paraffins in the effluent from the other end of the bed is minimized. Stated in another way, the concentration of normal paraffins in the effluent is kept at a very low level when the bed is placed on the adsorption step.

The yield of normal paraffin adsorbate may also be increased by flowing non-adsorbable or adsorbable gas into the other or effluent end of the bed for contacting with the molecular sieve at the secondary relatively low pressure and discharge through the one end. Again the phenomena is one of stripping the residual n-paraffins from the molecular sieve and moving them backwardly towards the one end, where a concentrated region of adsorbate develops, as illustrated in FIG. 4c. In the case of purging, lower concentrations of n-paraffins in the unadsorbed product effluent may be realized than with countercurrent repressurization alone due to the greater volume of stripping gas involved. The purge gas may be a non-adsorbable medium such as nitrogen, methane, helium, argon and the non-adsorbed portion of the feed gas. Alternatively, the purge gas may be a gas which is adsorbed by the molecular sieve, as for example n-butane, n-pentane, and the like. The advantage in using adsorbable instead of non-adsorbable gases is that the former also provide a displacement effect on the adsorbate, which of course is not characteristic of non-adsorbable purge gases.

As a further variation, the purging and repressurization steps may be combined after the pressure reduction step by flowing non-adsorbable gas such as methane or nitrogen into the other end of the bed for contacting with the molecular sieve material at the secondary relatively low pressure and discharge through the one end. The adsorption zone is then repressurized to a higher pressure prior to the normal paraffin adsorption step by continuing the non-adsorbable gas flow into the other end and terminating the purge discharge through the one end. Alternatively, the purging step may be effected by the previously described adsorbable gases, followed by repressurization with a non-adsorbable gas.

Another embodiment of the invention contemplates a process for separating a gaseous mixture which is first flowed at a selected initial relatively high pressure into one end and through a confined adsorption zone in contact with crystalline zeolitic molecular sieve material selective for at least one component of the feed mixture. The one component is progressively adsorbed from the feed stream in the zone, and a gaseous effluent stream is discharged from the other end of the zone under substantially the initial pressure of the feed stream. Thereafter the flow of the feed stream is stopped and the pressure at the one or feed inlet end is reduced to a secondary relatively low pressure. A gas stream is withdrawn from this end and the desorbed one component is countercurrently flowed toward the one end and discharged therethrough. A substantially non-adsorbable gas stream is introduced at the other end of the adsorption zone to repressurize the zone.

The advantages of this embodiment include the previously described facility for recovering a higher yield of the adsorbed one component, as well as a higher purity of this component. Alternatively, a higher purity of the non-adsorbed effluent is obtained. That is, the previous explanation of the advantages in countercurrent instead of cocurrent repressurization as illustrated in FIGS. 4a, 4b and 4c is also pertinent to separation of gas mixtures other than hydrocarbon streams containing n-paraffins. As long as one component such as an impurity is more strongly adsorbed by the molecular sieve than the remainder of the feed gas mixture, this embodiment may be employed. It should be noted that whereas in the previously described separation of n-paraffins from a hydrocarbon feed stream, the n-paraffin adsorbate was the desired product, in other systems the non-adsorbed portion of the feed gas mixture may be the desired product. In this event, the adsorbate may be an impurity which is discarded after the countercurrent depressurization step. The following is a list of impurities which are adsorbable by molecular sieves, and non-adsorbed gases which is typical of the separations attainable by the embodiment of the invention.

(1) Removal of oxygen, nitrogen, argon, krypton, methane, ammonia, water, carbon dioxide, carbon monoxide and hydrogen sulfide from air, helium and hydrogen.

(2) Removal of hydrocarbon impurities such as ethane, propane, butane, ethylene, propylene, butylene, and higher hydrocarbons from hydrogen, helium, argon, neon, krypton, oxygen, and nitrogen.

(3) Removal of carbon dioxide, hydrogen sulfide, ammonia, water, sulfur dioxide from hydrogen, methane, ethane, helium, nitrogen, argon, neon, krypton and oxygen.

(4) Removal of ethylene, propylene, acetylene and unsaturated hydrocarbons from saturated hydrocarbons.

The previously described purging step after pressure reduction and prior to repressurization can also be used advantageously in this embodiment for achieving a more complete separation of the adsorbable component. This is accomplished by, for example, introducing at least a portion of the gaseous effluent stream at the other end of the bed for flow countercurrent to the feed gas, and discharge from the one end. Other non-adsorbable purge gases may be used, as for example nitrogen or methane.

The term "zeolite," in general, refers to a group of naturally occurring and synthetic hydrated metal aluminosilicates, many of which are crystalline in structure. There are, however, significant differences between the various synthetic and physical properties such as X-ray powder diffraction patterns. The structure of crystalline zeolitic molecular sieves may be described as an open three-dimensional framework of $SiO_4$ and $AlO_4$ tetrahedra. The tetrahedra are crosslinked by the sharing of oxygen atoms, so that the ratio of oxygen atoms to the total of the aluminum and silicon atoms is equal to two, or $O/(Al+Si)=2$. The negative electrovalence of tetrahedra containing aluminum is balanced by the inclusion within the crystal of cations, for example, alkali metal and alkaline earth metal ions such as sodium, potassium, calcium and magnesium ions. One cation may be exchanged for another by ion-exchange techniques.

The zeolites may be activated by driving off at least a portion of the water of hydration. The space remaining in the crystals after activation is available for adsorption of adsorbate molecules having a size, shape and energy which permits entry of the adsorbate molecules into the pores of the molecular sieves. Activation may be conveniently carried out by heating the zeolite under reduced pressure until the water is removed. The temperature required depends upon the properties of the particular zeolite.

The zeolites occur as agglomerates of fine crystals or are synthesized as fine powders and are preferably tableted or pelletized for large-scale adsorption uses. Pelletizing methods are known which are very satisfactory because the sorptive character of the zeolite, both with regard to selectivity and capacity, remains essentially unchanged.

The selection of the particular zeolitic molecular sieve depends upon a number of factors, as for example the critical dimensions of the component to be adsorbed and the components to be rejected for adsorption. The term "critical dimension" refers to the diameter of the circumscribed circle of the cross section of the molecule's minimum area. These are calculated from available bond lengths, bond angles and van der Waals radii. To be satisfactory for use, the selected molecular sieve must have an apparent pore size which is at least as large as the critical dimension of the gas mixture component to be adsorbed.

It should be appreciated that in some molecular sieve adsorption processes, all of the components of the feed gas mixture may have critical dimensions of the same general order of magnitude, and are small enough to enter the pores of the selected molecular sieve. In this event, the adsorption separation is not based on the pore size selectivity and exclusion characteristic of crystalline zeolites, but rather on their preference for certain types of materials. For example they have a strong preference for molecules based on the degree of unsaturation, polarity and polarizability.

When n-paraffins are to be adsorbed from hydrocarbon vapor feed mixtures by the process of this invention, the molecular sieve should have an apparent pore size of about 5 Angstrom units. Among the suitable naturally occurring molecular sieves are erionite, calcium-rich chabazite and certain forms of mordenite and gmelinite. The natural materials are adequately described in the chemical art. Suitable synthetic zeolitic molecular sieves include zeolites D, R, S, T, and divalent metal cation-exchanged forms of zeolite A as exemplified by calcium zeolite A.

In certain hydrocarbon purifications, as for example removal of sulfur compounds or selective adsorption of aromatics, larger pored molecular sieves are preferred. These include the naturally occurring faujasite and the synthetic zeolites L, X and Y. Another suitable synthetic molecular sieve is the mordenite-type material known commercially as Zeolon, and described in Chemical and Engineering News, March 12, 1956, pages 52–54.

Zeolite A is a crystalline zeolitic molecular sieve which may be represented by the formula:

$$1.0\pm0.2M_2O:Al_2O_3:1.85\pm0.5SiO_2 yH_2O$$

wherein M represents a metal, $n$ is the valence of M, and $y$ may have any value up to about 6. The as-synthesized zeolite A contains primarily sodium ions and is designated sodium zeolite A. Calcium zeolite A is a derivative of sodium zeolite A in which about 40 percent or more of the exchangeable sodium cations have been replaced by calcium. Similarly, strontium zeolite A and magnesium zeolite A are derivatives of sodium zeolite A wherein about 40 percent or more of the exchangeable sodium ions have been replaced by the strontium or magnesium ions. Zeolite A is described in more detail in U.S. Patent No. 2,882,243 issued April 14, 1959.

Zeolite D is a crystalline zeolitic molecular sieve which is synthesized from an aqueous aluminosilicate solution containing a mixture of both sodium and potassium cations. In the as-synthesized state, zeolite D has the chemical formula:

$$0.9\pm0.2[xNa_2O:(1-x)K_2O]:Al_2O_3:wSiO_2:yH_2O$$

wherein $x$ is a value from zero to 1, $w$ is from about 4.5 to 4.9 and $y$ in the fully hydrated form is about 7. Further characterization of zeolite D by means of X-ray diffraction techniques is described in copending application Serial No. 680,383, filed August 26, 1957. The preparative conditions for zeolite D and its ion-exchanged derivatives and their molecular sieving properties are also described therein.

Zeolite R is described and claimed in U.S. Patent No. 3,030,181 issued April 17, 1962.

Zeolite S is described and claimed in U.S. Patent application Serial No. 724,843, filed March 31, 1958.

Zeolite T is a synthetic crystalline zeolitic molecular sieve whose composition may be expressed in terms of oxide mole ratios, as follows:

$$1.1\pm0.4[xNa_2O:(1-x)K_2O]:Al_2O_3:6.9\pm0.5SiO_2:yH_2O$$

wherein $x$ is any value from about 0.1 to about 0.8 and $y$ is any value from about zero to about 8. Further characterization of zeolite T by means of X-ray diffraction techniques is described in U.S. Patent No. 2,950,952 issued August 30, 1960.

Zeolite X is a synthetic crystalline zeolitic molecular sieve which may be represented by the formula:

$$0.9\pm0.2M_2O:Al_2O_3:2.5\pm0.5SiO_2:yH_2O$$

wherein M represents a metal, particularly alkali and alkaline earth metals, $n$ is the valence of M, and $y$ may have any value up to about 8, depending on the identity of M and the degree of hydration of the crystalline zeolite. Sodium zeolite X has an apparent pore size of about 9 Angstrom units. Zeolite X, its X-ray diffraction pattern, its properties, and methods of its preparation are described in detail in U.S. Patent No. 2,882,244 issued April 14, 1959.

Zeolite L is described and claimed in U.S. patent application Serial No. 711,565, filed January 28, 1958.

Zeolite Y is described and claimed in U.S. patent application Serial No. 109,487, filed May 12, 1961.

When the invention is to be employed for the adsorption of materials other than n-paraffins, it may be feasible to employ smaller pored molecular sieves, again depending primarily on whether the apparent pore size of the crystalline zeolite is large enough to admit the selected component. Among the smaller pored naturally occurring molecular sieves are harmotome, phillipsite and certain forms of mordenite and gmelinite. Smaller pored synthetic zeolite molecular sieves include type A in the monovalent cation forms and in which divalent cations may be present up to about 40 percent substitution.

Figure 5:
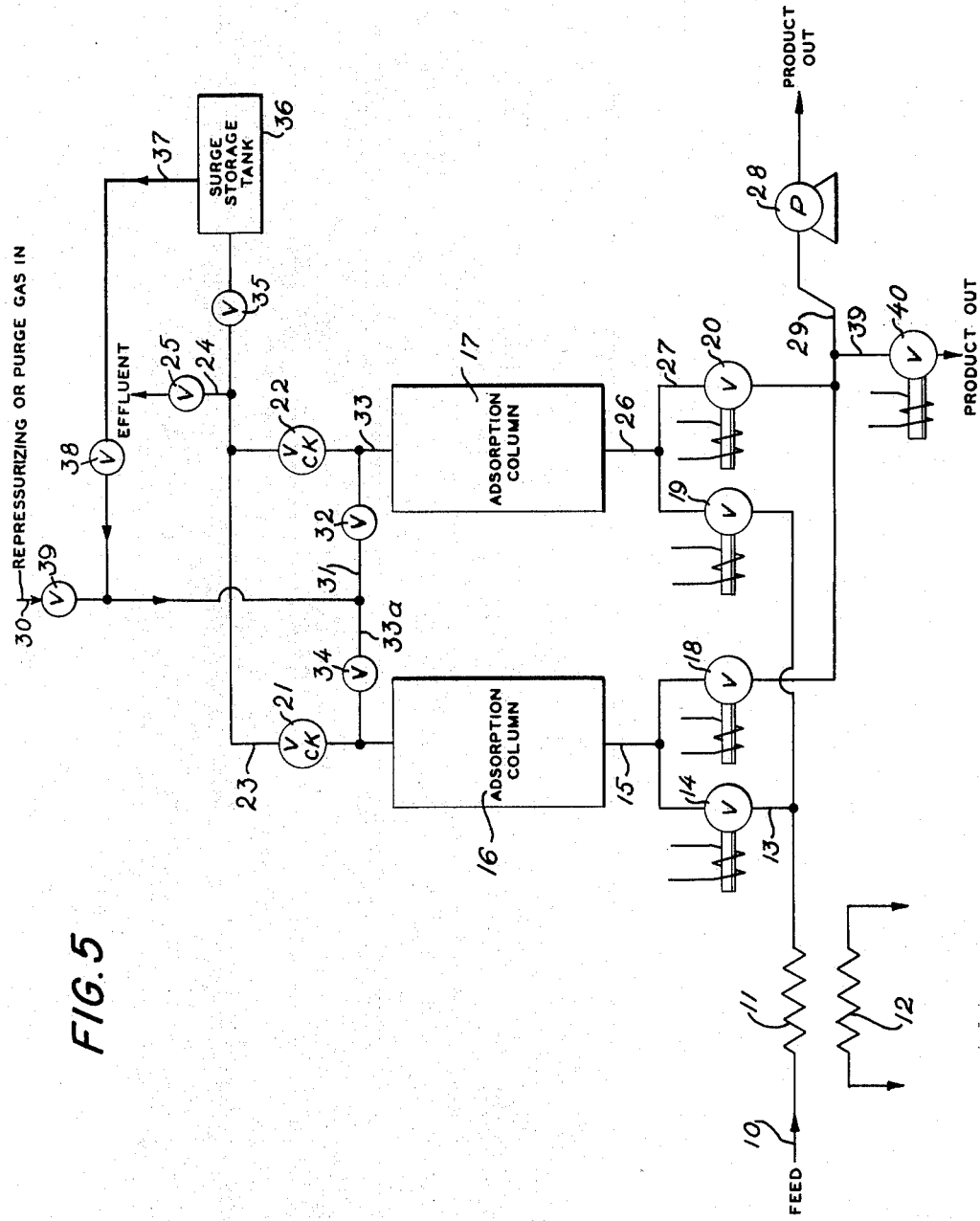
FIG. 5 is a schematic flowsheet of an apparatus arrangement suitable for separating a gaseous mixture, according to the present invention.

FIG. 5 illustrates apparatus suitable for practicing the processes of the invention. Although the flow sequences will be specifically described in terms of separating a hydrocarbon mixture, they would be substantially the same for separation of other gas mixtures, previously enumerated. The feed stream, i.e., light naphtha, is introduced through conduit 10 and if necessary heated by flow through passageway 11 in heat exchange with a warmer fluid in thermally associated passageway 12. As previously discussed, the adsorption temperature for n-paraffins is between about 660° F. and 850° F., as for example 700° F.

The adsorption pressure must not be so high as to reach the dew point of the feed mixture; that is, the mixture must be kept in the vapor phase. On the other hand, it is preferable to conduct the feed mixture-molecular sieve contact at as high a pressure as possible, because high adsorbate loadings on the molecular sieve are realized.

The feed steam at, for example, 700° F. and 65 p.s.i.g. is diverted from conduit 10 through branch conduit 13, having time-controlled automatic valve 14 therein to conduit 15 and thence into the bottom of adsorption zone 16. Both zones 16 and 17 are packed with a crystalline zeolitic molecular sieve material, as for example calcium zeolite A, having an apparent pore size of about 5 Angstrom units. Zones 16 and 17 are piped in parallel, so that when one zone, i.e. 16, is on the adsorption step, the other zone, i.e. 17, is being desorbed, purged or repressurized. The flows are periodically switched, for example, on a time cycle, by automatically controlled valves 14 and 18 at the one or feed inlet end of zone 16, and corresponding valves 19 and 20 at the feed inlet end of zone 17. Check valves 21 and 22 are provided at the other or effluent end of zones 16 and 17, respectively.

Returning now to zone 16 on the adsorption step, the n-paraffins are removed from the feed stream and internally adsorbed by the calcium zeolite A material. The non-adsorbed hydrocarbons are discharged from the other or effluent end of zone 16 into conduit 23 having check valve 21 therein, and then directed through branch conduit 24 and control valve 25 therein as a by-product. In the case of naphtha feed streams, the non-adsorbed effluent is primarily branched chain, olefinic and aromatic hydrocarbons.

During the period zone 16 is on the adsorption step, zone 17 is being desorbed by pressure reduction at the one end thereof and withdrawal of desorbate product gas through conduit 26 connecting with branch conduit 27 having automatic control valve 20 therein. Thus, desorption is by depressurization in a direction countercurrent to the direction of feed gas flow during the adsorption step. The pressure in zone 17 is reduced to a secondary relatively low pressure, preferably sub-atmospheric e.g. 1 p.s.i.a., by a vacuum pump 28 in conduit 29 connecting with conduit 27. Evacuation may also be aided by cooling the desorbate gas prior to passage through the vacuum pump 28. The n-paraffin product gas is discharged through conduit 29.

As the adsorption in zone 16 continues, an adsorption front moves from the one end towards the other end, and at a predetermined time in the cycle, the flows are switched by the automatic control valves 14, 18, 19 and 20 to place zone 17 on the adsorption step and zone 16 on the desorption step. The cycle may be timed for switching prior to the point at which the adsorption front reaches the other end, or alternatively when the concentration of at least one of the normal paraffins materially increases in the effluent gas emerging through conduit 24. A typical cycle time is 5 minute on adsorption, and 5 minutes on desorption.

If it is desired to repressurize the desorbed zone 17 at the end of the depressurization step and prior to the succeeding adsorption step, a gas such as non-adsorbable nitrogen may be introduced through conduit 30 and automatic control valve 32 therein to conduit 33 for passage into the other or effluent end of zone 17. Automatic control valve 20 at the one or feed inlet end of zone 17 is also closed so that the latter may be repressurized to a higher pressure level, as for example the feed gas pressure. When zone 17 is placed on the adsorption step, valve 32 is, of course, closed. Repressurization of zone 16 is achieved in an analogous manner, by the flow of nitrogen gas through conduit 30 to conduit 33a having control valve 34 therein, and by closing valve 18 at the feed gas inlet end. The repressurizing step may, for example, replace the last minute of the desorption step, so that in the five-minute cycle illustration, the adsorption zones 16 and 17 are depressurized and desorbed for the first four minutes and repressurized for the last one minute corresponding to the other zone's five-minute adsorption step.

As previously discussed, zones 16 and 17 may also be repressurized by the non-adsorbed by-product effluent at the end of the desorption step. In this event at least a portion of the non-adsorbed effluent stream is directed through conduit 23 and control valve 35 to surge-storage tank 36. At the end of the desorption step, the pressurized gaseous effluent in tank 36 is led through conduit 37 having automatic flow control valve 38 therein to a junction with conduit 30. The effluent then countercurrently repressurizes either zone 16 or 17 in the same manner as the preivously described nitrogen gas.

If it is desired to purge the appropriate zone 16 or 17 at the conclusion of the pressure reduction step, adsorbable or non-adsorbable gas is introduced through conduit 30, either from an external source, i.e. nitrogen or the non-adsorbed effluent from surge-storage tank 36. The purge gas, for example, is admitted through conduit 31 and connecting conduit 33 to the other end of zone 17 for flow therethrough in a direction countercurrent to the feed gas flow. The purge gas sweeps out most of the remaining n-paraffin adsorbate, is discharged through the one end of zone 17 into conduit 26, thence through connecting conduit 27 to conduit 29. The purge gas containing n-paraffins may be recovered by flow through vacuum pump 28. Alternatively, if purging is at above atmospheric pressure, the purge gas may be discharged to the atmosphere through conduit 39 having automatic control valve 40. The purge step follows the depressurization-desorption step, and may, for example, continue for one minute, immediateley prior to the adsorption step.

As a further variation, the purge step may follow the depressurization-desorption step and precede a repressurization step. If the same fluid is to be employed for both functions, the flow through conduit 30 and connecting piping continues and the only change for repressurization is that of closing automatic control valve 20 (for zone 17) or valve 18 (for zone 16). In the same cycle time illustration, the purge step may be for one minute and the repressurization may be for one minute, so that the duration of the depressurization-desorption step is three minutes.

If different fluids are to be used for succeeding purge and repressurization steps, the desired flows may be effected by appropriate opening or closing of valve 38 in conduit 37, and valve 39 in conduit 30.

The invention is further illustrated by the following examples.

*Example I*

In this experiment, a bed of calcium A zeolite was used to adsorb carbon dioxide and lighter weight hydrocarbon impurities from a nitrogen gas feed stream at 255–265 p.s.i., followed by countercurrent depressurization to atmospheric pressure, countercurrent purging with nitrogen gas (containing the non-adsorbed impurities) at 0–6 p.s.i., and finally countercurrent repressurization to the feed stream pressure with the same nitrogen. The adsorber dimensions were 3 inches diameter and 90 inches packed length. The molecular sieve was 17.0 lbs. of ⅛-inch activated pellets, and the feed gas specifications were 900 p.p.m. $CO_2$ in nitrogen at a temperature of 25° C. and flow rate of 848–876 c.f.h. (N.T.P.). The analytical composition of the feed and purge gases was a follows:

| | Feed (percent) | Purge (percent) |
| --- | --- | --- |
| Impurities: composition— | | |
| $C_2H_6$ | 54.0 | 83 |
| $C_2H_4$ | 28.0 | |
| $C_3H_8$ | 11.0 | 17 |
| $C_3H_6$ | 2.5 | |
| $CO_2$ | 4.5 | 30 p.p.m. |
| Totals, percent | 100 | 100 |
| Ratio to $N_2$ | 1:50 | 1:20 |

The cycle time periods were as follows:

Adsorption _____ 10 min., 0 sec.
Depressurization _____ 0 min., 15 sec.
Purge _____ 9 min., 30 sec.
Repressurization _____ 0 min., 15 sec.

Total _____ 20 min., 0 sec.

After stable operating conditions were established, it was found that very little carbon dioxide passed more than one-third of the length of the bed, and the effluent contained less than 2 p.p.m. carbon dioxide.

*Example II*

This experiment was similar to Example I except that acetylene was added to the feed mixture to give impurities of 600 p.p.m. carbon dioxide and 300 p.p.m. acetylene. The unit was run for 33 cycles; very little carbon dioxide or acetylene passed beyond one-third of the bed length.

Example III

In still another experiment using the apparatus of Example I, a nitrogen feed gas containing 300 p.p.m. carbon dioxide was used and contacted with the same calcium zeolite A bed at 500 c.f.h. (N.T.P.), 60 p.s.i. and 25° C., followed by countercurrent depressurization, purge and finally repressurization. The purging was effected with 220 c.f.h (N.T.P.) of dry nitrogen at atmospheric pressure. Although the test was only run for 11 cycles, the carbon dioxide adsorption gradients stabilized quickly with little change after the first few cycles. The test showed that the carbon dioxide impurity could be removed from the feed gas to a concentration below 2 p.p.m. in the effluent.

The cycle time periods were as follows:

Adsorption _____ 20 min., 0 sec.
Depressurization _____ 0 min., 30 sec.
Purge _____ 19 min., 0 sec.
Repressurization _____ 0 min., 30 sec.

Example IV

In a further experiment the apparatus of Example I was used to remove water and carbon dioxide impurities from nitrogen gas at 560 c.f.h. (N.T.P.), 60 p.s.i.g. and 25° C., by means of sodium zeolite X having an apparent pore size of about 9 Angstrom units. Desorption was by countercurrent depressurization to atmospheric pressure, followed by countercurrent purging by 200 c.f.h (N.T.P.) nitrogen gas at 1.5 p.s.i.g. The purged adsorbent was repressurized countercurrently to the feed gas pressure with the same nitrogen gas. This test was made to simulate removal of atmospheric contaminants from the air feed to an oxygen-nitrogen separation plant, and the large pored zeolite X was successful in removing 300 p.p.m. carbon dioxide, the normal concentration of this impurity in atmospheric air. No noticeable change in the cyclic carbon dioxide adsorption patterns in the bed was noticed after 18 cycles, indicating that stable operating conditions had been attained.

Example V

The feed gas has the following molar composition: $N_2$—86.5%, $CO_2$—11.2%, $O_2$—0.9%, $H_2O$—0.7%, $C_2H_4$—0.4%, $C_2H_6$—0.3%. It is desired to remove the carbon dioxide and other impurities, insofar as possible. At feed gas flow conditions of 150° F., 147 p.s.i.g. and 6000 cu./min. (N.T.P.), this may be accomplished by the present invention, using two beds of calcium zeolite A adsorbent, each weighing 15,120 lbs., having a length of 11 feet and a diameter of 6 feet. The components are arranged in a manner very similar to FIG. 5, and the cycle is as follows: adsorption for 5 minutes, countercurrent depressurization to 2 p.s.i.g. for 26 seconds, countercurrent purge with a non-adsorbable gas for 4 minutes and 6 seconds and countercurrent purge and repressurization with the purified nitrogen product gas at a rate of about 2680 cu. ft. per cycle, for 28 seconds. The product is at least 97.8 mol percent $N_2$, having an $H_2O$ dew point of −40° F. and containing less than 0.5 mol percent $CO_2$.

In summary, the present invention provides a highly efficient adsorption process for separating gas mixtures with improved purities and yields of both the adsorbed and non-adsorbed components. This process does not require the use of a third adsorbent bed as a standby, since formation of carbonaceous matter is minimized. Also, the invention eliminates the need for introduction of external heat during desorption, thereby permitting faster cycling and greater gas throughput per unit time. The process operates substantially isothermally, thereby avoiding equipment maintenance problems characteristic of varying temperature systems.

Although particular embodiments of this invention have been described in detail, it is contemplated that modifications of the process may be made and that some features may be employed without others, all within the scope of the invention.

What is claimed is:

1. A process for separating normal paraffins containing at least four carbon atoms from a vapor feed mixture thereof with at least other hydrocarbons which process comprises: repeating in sequence the steps of flowing the hydrocarbon containing vapor feed mixture at a selected initial relatively high pressure into one end of an adsorption zone also having another end and containing crystalline zeolitic molecular sieve material which selectively adsorbs said normal paraffins having critical dimensions up to about 5 Angstrom units, and contacting said vapor feed mixture and said molecular sieve material at said selected initial relatively high pressure and temperatures between about 660° F. and 850° F.; discharging gaseous effluent stream from the other end of said adsorption zone at substantially the selected initial relatively high pressure of said vapor feed mixture terminating the flow of vapor feed mixture to said adsorption zone when said molecular sieve is at least partially loaded with said normal paraffins; reducing the pressure at said one end to a secondary relatively low pressure, thereby progressively desorbing said normal paraffins from said molecular sieve without the introduction of external heat, and discharging a gas stream countercurrent to the previously flowing vapor feed mixture from said zone at said one end at which the hydrocarbon vapor feed was introduced, said gas stream including the desorbed normal paraffins and consisting only of gas from said vapor feed mixture present in said adsorption zone prior to the pressure reduction; stopping the discharging of said gas stream through said one end; and thereafter raising the pressure in said adsorption zone to a higher pressure by introducing at a higher pressure at least a portion of said gaseous effluent stream to said other end of said adsorption zone.

2. A process according to claim 1 which includes purging said adsorption zone after the pressure reduction step and before the pressure raising step by flowing only non-adsorbable gas into said other end and contacting such gas with the molecular sieve material at said secondary relatively low pressure, thereby further desorbing normal paraffin and discharging a normal paraffins, non-adsorbable purge gas mixture through said one end; terminating the purge gas discharging through said one end, and thereafter initiating said pressure raising step.

3. A process according to claim 1 which includes purging said adsorption zone after the pressure reduction step and before the pressure raising step by flowing adsorbable gas into said other end for contacting with the molecular sieve material at said secondary relatively low pressure, thereby displacing additional adsorbed normal paraffins and discharging the displaced normal paraffins through said one end of the adsorption zone; stopping the adsorbable gas flow through said one end, and thereafter initiating said pressure raising step.

4. A process for separating normal paraffins containing at least four carbon atoms from a vapor mixture thereof with other isomer hydrocarbons, which process comprises: repeating in sequence the steps of flowing a hydrocarbon feed stream at a selected initial relatively high pressure into one end of an adsorption zone containing crystalline zeolitic molecular sieve, which preferentially adsorbs said normal paraffins having critical dimensions up to about 5 Angstrom units and excludes said isomer hydrocarbons; discharging a gaseous effluent stream of said isomer hydrocarbons from the other end of said zone under substantially the selected initial relatively high pressure of said feed stream thereafter stopping the flow of said feed stream; reducing the pressure at said one end to a secondary relatively low pressure and withdrawing a gas stream from said one end, thereby progressively desorbing said normal paraffins from said molecular sieve and flowing the desorbed normal paraffins toward said one end countercurrent to the previously flowing feed stream and discharging said normal paraffins from said adsorption zone at said one end at which said feed stream was introduced, said gas stream consisting only of gas from said hydrocarbon feed stream present in said adsorption zone when the feed stream flow is stopped; stopping the normal paraffins discharge from said one end; and thereafter raising the pressure in said adsorption zone to said selected initial relatively high pressure thereof by introducing at least a portion of the gaseous effluent isomer hydrocarbon stream at said other end and at such relatively high pressure.

References Cited by the Examiner
UNITED STATES PATENTS

| | | |
|---|---|---|
| 2,859,256 | 11/1958 | Hess et al. |
| 2,881,862 | 4/1959 | Fleck et al. _____ 55—75 X |
| 2,882,243 | 4/1959 | Milton _____ 55—75 |
| 2,889,893 | 6/1959 | Hess et al. _____ 55—75 |
| 2,901,519 | 8/1959 | Patterson et al. ____ 55—75 X |
| 2,918,140 | 12/1959 | Brooks _____ 55—58 |
| 2,920,037 | 1/1960 | Haensel _____ 260—674 X |
| 2,920,038 | 1/1960 | Feldbauer et al. ____ 208—310 |
| 2,940,926 | 6/1960 | Henke et al. |
| 2,944,092 | 7/1960 | Feldbauer et al. ____ 55—75 X |
| 2,944,627 | 7/1960 | Skarstrom _____ 55—62 |
| 2,950,336 | 8/1960 | Kimberlin et al. ____ 55—75 X |
| 2,952,630 | 9/1960 | Eggertsen et al. ____ 55—75 X |
| 2,958,645 | 11/1960 | Kimberlin et al. ____ 208—310 |
| 2,958,714 | 11/1960 | Kearby _____ 208—310 |
| 2,966,531 | 12/1960 | Louis _____ 208—310 |
| 2,978,407 | 4/1961 | Tuttle et al. _____ 55—75 |
| 3,024,867 | 3/1962 | Milton _____ 55—33 |
| 3,037,338 | 6/1962 | Thomas _____ 55—75 X |
| 3,069,830 | 12/1962 | Skarstrom et al. ____ 55—62 X |
| 3,085,379 | 4/1963 | Kiyonaga et al. _____ 55—62 X |
| 3,086,339 | 4/1963 | Skarstrom et al. ____ 55—62 X |
| 3,102,013 | 8/1963 | Skarstrom _____ 55—62 X |
| 3,104,162 | 9/1963 | Skarstrom _____ 55—62 X |
| 3,138,439 | 6/1964 | Skarstrom _____ 55—53 |

OTHER REFERENCES

"Low Dew-Point Compressed Air," Compressed Air Magazine, September 1959, pages 11 to 13.

REUBEN FRIEDMAN, *Primary Examiner.*